United States Patent
Pietras et al.

(10) Patent No.: US 6,847,891 B2
(45) Date of Patent: Jan. 25, 2005

(54) ROUTE STORAGE AND RETRIEVAL FOR A VEHICLE NAVIGATION SYSTEM

(75) Inventors: David J Pietras, Macomb, MI (US); Nabil M Issa, Novi, MI (US); Abdul-Majeed Kadi, Bloomfield, MI (US)

(73) Assignee: DaimlerChrysler, Auburn Hills, MI (US)

( * ) Notice: Subject to any disclaimer, the term of this patent is extended or adjusted under 35 U.S.C. 154(b) by 0 days.

(21) Appl. No.: 10/356,459

(22) Filed: Jan. 31, 2003

(65) Prior Publication Data

US 2004/0153240 A1 Aug. 5, 2004

(51) Int. Cl.[7] .............................................. G01C 21/00
(52) U.S. Cl. ...................... 701/211; 701/207; 701/213; 340/990; 340/995
(58) Field of Search ............................... 701/211, 207, 701/208, 202, 200, 201, 205, 209, 210, 213, 214; 340/990, 995, 988

(56) References Cited

U.S. PATENT DOCUMENTS

| | | | |
|---|---|---|---|
| 5,995,023 A | * 11/1999 | Kreft | 340/995.25 |
| 6,430,502 B1 | 8/2002 | Pournain et al. | 701/211 |
| 6,456,931 B1 | * 9/2002 | Polidi et al. | 701/208 |
| 6,510,386 B2 | * 1/2003 | Sakashita | 701/211 |
| 6,708,113 B1 | * 3/2004 | Von Gerlach et al. | 701/210 |
| 2003/0139880 A1 | * 7/2003 | Leimbach et al. | 701/217 |

* cited by examiner

Primary Examiner—Marthe Y. Marc-Coleman

(74) Attorney, Agent, or Firm—Ralph E. Smith

(57) ABSTRACT

A method for recording and storing a route of a motor vehicle in an undigitized area of a vehicle navigation system comprises determining a first position of the motor vehicle using a Global Positioning System. This first position is then recorded in the vehicle navigation system. A second position of the motor vehicle is determined after the motor vehicle has traveled a predetermined distance from the first position. This second position is also recorded in the vehicle navigation system. The first position is then connected to the second position in order to form a route in the vehicle navigation system. The route has a segment in an undigitized area of the vehicle navigation system. The route is then stored in the vehicle navigation system and may be retrieved at a later time.

6 Claims, 2 Drawing Sheets

ROUTE STORAGE AND RETRIEVAL FOR A VEHICLE NAVIGATION SYSTEM

FIELD OF THE INVENTION

The present invention relates to vehicle navigation systems and more particularly to a method of storing and retrieving a route for a motor vehicle in a vehicle navigation system.

BACKGROUND OF THE INVENTION

The typical vehicle navigation system provides a recommended route from a starting point to a destination point. The starting point is typically the position of the motor vehicle and is usually determined by a Global Positioning System, as is well known in the art. The destination point is selected by the operator of the motor vehicle from a database of preprogrammed, digitized roads or locations within the vehicle navigation system. The vehicle navigation system then guides the operator of the motor vehicle along this recommended route using either voice commands or graphical icons.

While these typical vehicle navigation systems generally work in a satisfactory manner, there are some limitations. The typical vehicle navigation system can only guide the operator of the motor vehicle along roads that have been preprogrammed and digitized into the vehicle navigation system. The vehicle navigation system cannot guide the operator of the motor vehicle along any undigitized roads, for example new roads, rural paths, or paths over open terrain.

Therefore, there is seen to be a need in the art to provide a method for recording, storing, and retrieving a recorded route in a vehicle navigation system where the route includes undigitized segments.

SUMMARY OF THE INVENTION

The present invention provides a method for recording and storing a route of a motor vehicle in an undigitized area of a vehicle navigation system. A first position of the motor vehicle in an undigitized area is determined using a Global Positioning System or similar method. This first position is then recorded in the vehicle navigation system. A second position of the motor vehicle is determined after the motor vehicle has traveled a predetermined distance from the first position. This second position is also recorded in the vehicle navigation system. The first position is then connected to the second position by a line in order to form a route in the vehicle navigation system. The route has a segment in an undigitized area of the vehicle navigation system. This method may be repeated for a plurality of points each equidistant from one another and these points may be connected to form a route in the vehicle navigation system. This route is then stored in the vehicle navigation system and may be retrieved at a later time by the operator of the motor vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
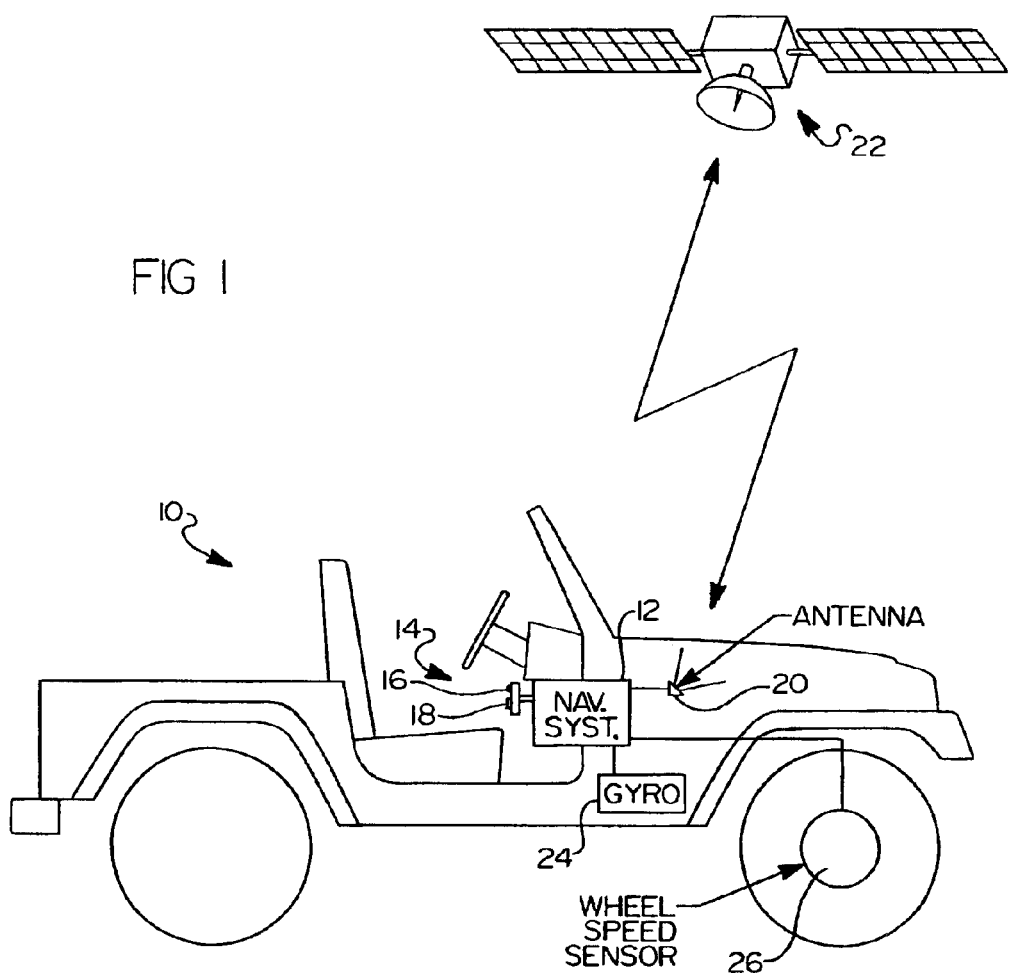
FIG. 1 is a schematic view of a motor vehicle having a vehicle navigation system according to the principles of the present invention.

Referring now to FIG. 1, there is shown a schematic view of a motor vehicle 10 having a vehicle navigation system 12 mounted within an instrument panel of the motor vehicle 10. The vehicle navigation system 12 includes a faceplate 14 having a plurality of input devices 18 and a display 16 viewable by an operator of the motor vehicle 10. The plurality of input devices 18 control the vehicle navigation system and may take various configurations, for example depressible buttons or rotating knobs.

The vehicle navigation system 12 further includes a receiver 20 that communicates with a Global Positioning System (GPS) 22, illustrated schematically as a satellite in FIG. 1. The GPS 22 continuously provides the location of the motor vehicle 10 in relation to a digitized map stored in the vehicle navigation system 12.

The vehicle navigation system 12 is in communication with a gyroscope 24 and a wheel speed sensor 26. The gyroscope 24 continuously provides the direction or heading of the motor vehicle 10 to the vehicle navigation system 12. The wheel speed sensor 26 continuously provides the speed of the motor vehicle 10 to the vehicle navigation system 12 which uses the speed to determine the distance that the motor vehicle 10 has traveled. The gyroscope 24 and the wheel speed sensor 26 can be used to estimate a position of the motor vehicle 10 from a last known GPS position when the GPS 22 is disrupted by interference.

Figure 2:
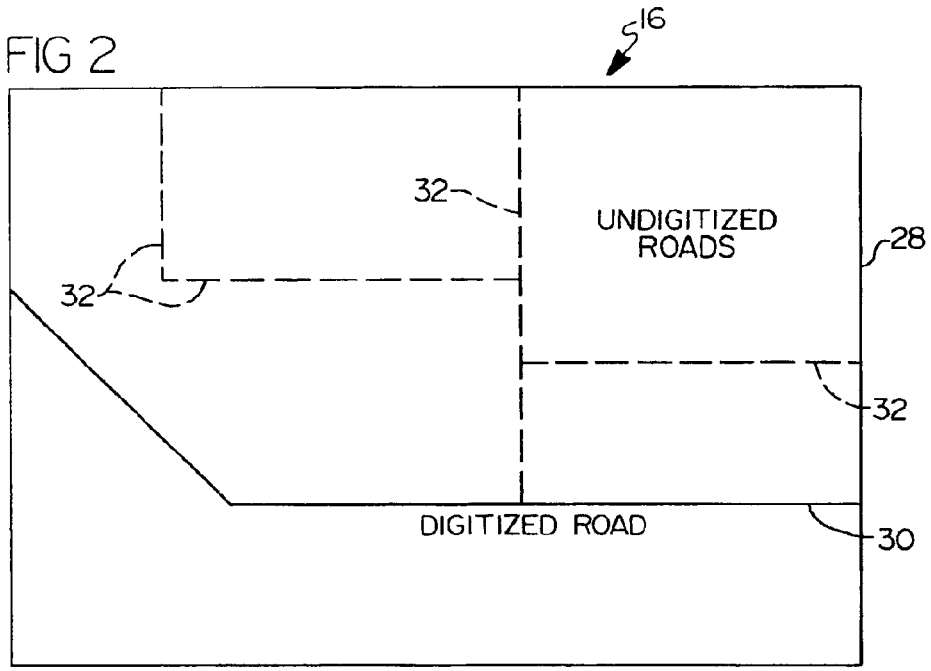
FIG. 2 is an illustration of a map display of the vehicle navigation system according to the principles of the present invention.

Referring now to FIG. 2, the display 16 is illustrated to show a digitized map 28 stored within the vehicle navigation system 12. The digitized map 28 shows a digitized road 30 that has been preprogrammed into the vehicle navigation system 12. Undigitized roads 32, illustrated as dashed lines on the display 16, are not preprogrammed into the vehicle navigation system 12 and therefore would not be viewable on the display 16 by the operator of the motor vehicle 10.

Figure 3:
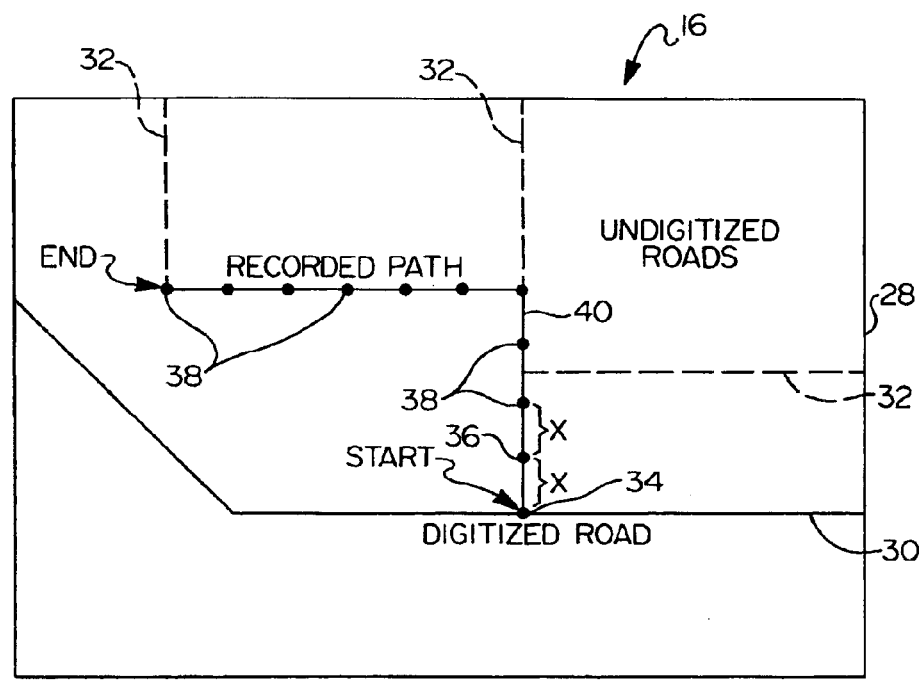
FIG. 3 is an illustration of a map display with a stored route in the vehicle navigation system according to the principles of the present invention.

Referring now to FIG. 3, there is illustrated a method for recording and storing a route along the undigitized roads 32. Generally, the operator of the motor vehicle 10 activates this method through the plurality of input devices 18. The vehicle navigation system 12 begins by determining a first position of the motor vehicle 10. This first position may be determined by the GPS 22 or by using the gyroscope 24 with the wheel speed sensor 26 to estimate the first position from a last known GPS position. The first position is then recorded by the vehicle navigation system 12 as a point 34 on the digitized map 28. After the motor vehicle 10 has traveled a predetermined distance, illustrated as an "x" in FIG. 3, the vehicle navigation system 12 determines a second position of the motor vehicle 10. The predetermined distance "x" may have any value, for example 80 meters, and is measured by the GPS 22 or by the wheel speed sensor 26. The vehicle navigation system 12 records the second position as a second point 36 on the digitized map 28.

As the motor vehicle 10 continues to travel along the undigitized roads 32, the vehicle navigation system 12 continues to automatically record the position of the motor vehicle 10 as a plurality of points 38. Each of the plurality of points 38 are at a distance of "x" from the previous point. The vehicle navigation system 12 then connects the first point 34, the second point 36, and the remaining plurality of points 38 to form a recorded route 40. The recorded route 40 is viewable by the operator of the motor vehicle 10 on the display 16. Once the motor vehicle 10 has reached its desired destination, the operator ends the recording method through the plurality of input devices 18. The recorded route 40 is then saved and stored within the vehicle navigation system 12.

In the particular example provided, the recorded route 40 is shown to start on the digitized road 30 and follow the undigitized roads 32. However, the recorded route 40 may start on an undigitized area of the digitized map 28 and follow cross-country trails or open terrain.

Once stored in the vehicle navigation system 12, the recorded route 40 may be retrieved at any time by the operator of the motor vehicle 10 through the plurality of input devices 18. Navigation along the recorded route 40 is accomplished by first determining the position of the motor vehicle 10 with respect to the recorded route 40. The vehicle navigation system 12 then guides the operator of the motor vehicle 10 to the closest of the points 34, 36, and 38 along the recorded route 40. In the preferred embodiment, the vehicle navigation system 12 displays a graphical icon on the digitized map indicating the direction in which the motor vehicle 10 should travel. Alternate methods of guiding the operator of the motor vehicle 10, such as voice commands, may also be employed.

Once the motor vehicle 10 is on the recorded route 40, the vehicle navigation system 12 guides the motor vehicle 10 from point to point along the recorded route 40 until reaching the desired destination.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for recording and storing a route having at least one undigitized segment for a motor vehicle equipped with a vehicle navigation system comprising the steps of:
   determining a plurality of positions of the motor vehicle, wherein each of said plurality of positions are a predetermined distance away from a previous position and a portion of said plurality of positions are in an undigitized area of the vehicle navigation system;
   recording said plurality of positions of the motor vehicle;
   connecting said plurality of positions with said previous positions to form a route having a segment in an undigitized area of the vehicle navigation system; and
   storing said route in the vehicle navigation system.

2. The method for recording and storing a route of a motor vehicle in an undigitized area of claim 1, wherein said predetermined distance is measured by a wheel speed sensor that determines the distance the motor vehicle has traveled after recording said first position.

3. The method for recording and storing a route of a motor vehicle in an undigitized area of claim 2, wherein successive positions of the plurality of positions are determined by the vehicle navigation system using a gyroscope to measure the direction that the motor vehicle has traveled.

4. The method of recording and storing a route of motor vehicle in an undigitized area of claim 1, wherein successive positions of said plurality of positions are determined by a global positioning system that sends the position of the motor vehicle to the vehicle navigation system.

5. The method for recording and storing a route of a motor vehicle in an undigitized area of claim 1, further comprising a first step of depressing a button on the vehicle navigation system and a final step of depressing said button on the vehicle navigation system.

6. The method of claim 1 further comprising:
   determining a position of the motor vehicle with respect to said stored route;
   guiding the motor vehicle from said position to the closest point of said stored route using a graphical icon whenever said determined position is not on said stored route.

* * * * *

UNITED STATES PATENT AND TRADEMARK OFFICE
CERTIFICATE OF CORRECTION

PATENT NO. : 6,847,891 B2
DATED : January 25, 2005
INVENTOR(S) : Pietras et al.

It is certified that error appears in the above-identified patent and that said Letters Patent is hereby corrected as shown below:

<u>Title page</u>,
Item [73], Assignee, "DaimlerChrysler" should be -- DaimlerChrysler Corporation --

Signed and Sealed this

Twenty-sixth Day of April, 2005

JON W. DUDAS
*Director of the United States Patent and Trademark Office*